United States Patent [19]

Barben et al.

[11] Patent Number: 5,275,458
[45] Date of Patent: Jan. 4, 1994

[54] TONNEAU COVER ASSEMBLY

[75] Inventors: Jack Barben, Union, Mich.; Ross Weldy, Elkhart; Benjamin M. Kersting, Bristol, both of Ind.

[73] Assignee: Custom Form Manufacturing, Inc., Elkhart, Ind.

[21] Appl. No.: 873,898

[22] Filed: Apr. 24, 1992

Related U.S. Application Data

[63] Continuation of Ser. No. 677,123, Mar. 29, 1991, abandoned.

[51] Int. Cl.$^5$ .............................................. B60J 7/10
[52] U.S. Cl. ................................. 296/100; 296/104; 29/239; 29/270; 160/379; 248/231.5; 248/231.7
[58] Field of Search ............... 296/41, 98, 100, 104, 296/118, 136; 29/235, 239, 270; 160/371, 378, 379, 404, 328; 248/316.2, 316.3, 231.3, 231.5, 231.7, 510; 135/101, 106, 107, 108

[56] References Cited

U.S. PATENT DOCUMENTS

| | | | |
|---|---|---|---|
| D. 55,792 | 7/1920 | Hudgins | 29/270 |
| 307,978 | 11/1884 | Parks | 296/104 |
| 2,503,683 | 4/1950 | Perkins | 29/270 |
| 3,222,103 | 12/1965 | Wernig et al. | 296/136 |
| 3,223,446 | 12/1965 | Coppock et al. | 296/136 |
| 3,578,378 | 5/1971 | Anderson | 296/100 |
| 3,727,972 | 4/1973 | Belk . | |
| 3,773,379 | 11/1973 | Loiseau | 296/107 |
| 3,936,077 | 2/1976 | Bilek | 296/100 X |
| 3,995,649 | 12/1976 | Robichaud | 135/107 X |
| 4,036,521 | 7/1977 | Clenet | 296/100 |
| 4,061,394 | 12/1977 | Vodin | 296/100 |

(List continued on next page.)

FOREIGN PATENT DOCUMENTS 0613741 10/1979 Switzerland ................ 135/101

OTHER PUBLICATIONS

Sportmasters brochure, undated.
Pick-Up Pleasers Covers Brochure-Innovative Accessories, Inc., undated.
Tough Tonneau with Zip Grip Brochure-Extang, undated.
Tough Tuff Tonno Brochure-Extang Corporation, undated.
Tough-Tonneau Brochure-Extang Corporation, undated.
Luxxus Truxcover Brochure-Innovative Accessories, Inc., undated.
Fastback Rigid Tonneau Cover Brochure-Urban Industries, Inc., undated.

*Primary Examiner*—Dennis H. Pedder
*Attorney, Agent, or Firm*—Barnes & Thornburg

[57] ABSTRACT

A tonneau cover assembly is provided having a rail network, a plurality of clamps, one or more crossbars and a flexible top. The rail network is secured about the bed of a pick-up truck, using clamps. Thus, no holes are made in the vehicle, and the entire tonneau cover assembly can be mounted without the use of tools. After the rail network is secured to the truck, the crossbars are placed over the truck bed, and snap onto the clamps. Insert tips allow the crossbars to adjust to various lengths. A tang on the clamp is received by the insert tip, and provides resistance to torsional forces. A hook assembly is sewn about the periphery of the flexible cover and is secured to the rail network. To disengage the flexible cover from the rail network, a stripping member is used. In the first preferred embodiment, the stripping member rests within the rail network and forcibly ejects a portion of the hook assembly from the rail network. In a second preferred embodiment, the stripping member is a part of the hook assembly. Exerting a force on the stripping member disengages a portion of the hook assembly from the rail network. Once a portion of the hook assembly is disengaged from the rail, the remainder of the flexible cover can be easily peeled away.

10 Claims, 2 Drawing Sheets

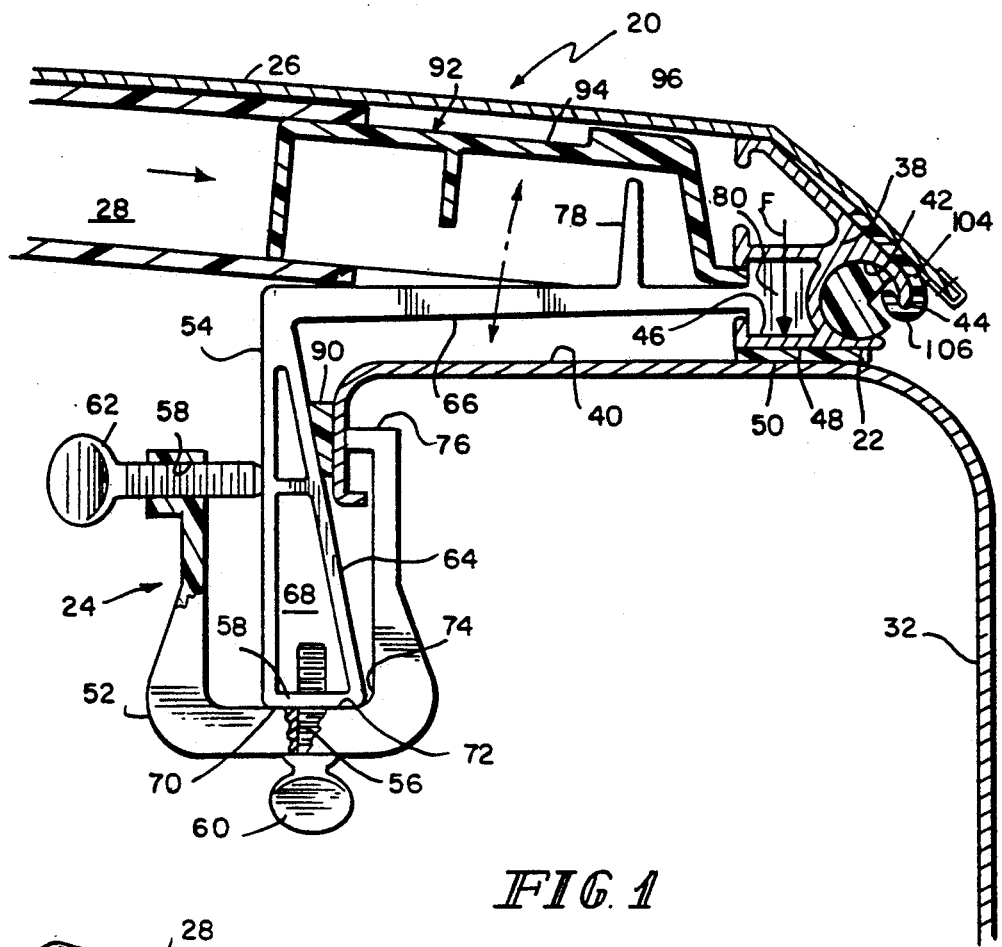
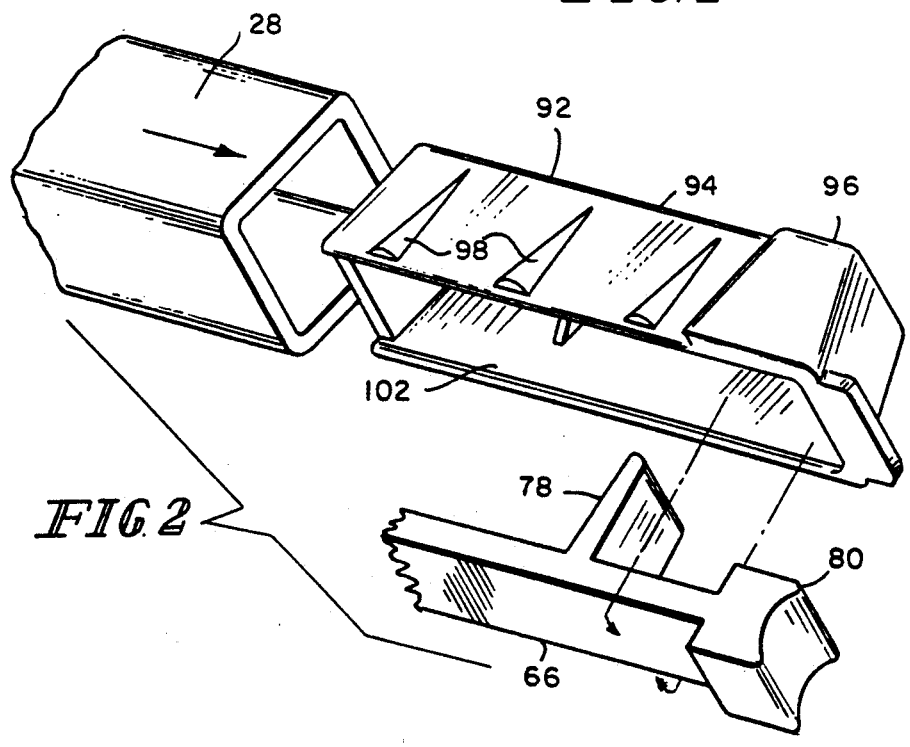
FIG. 1
FIG. 2

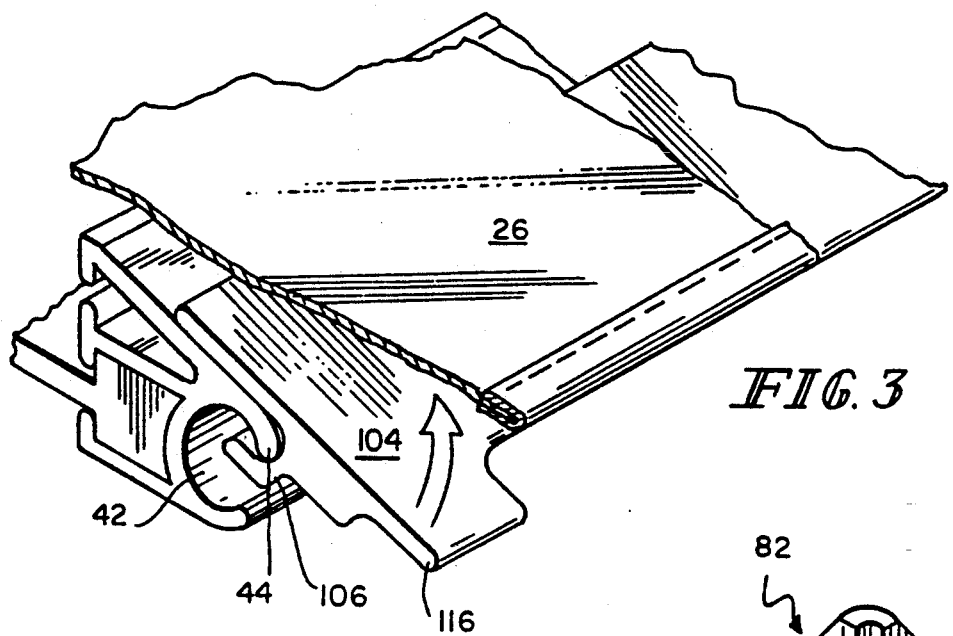
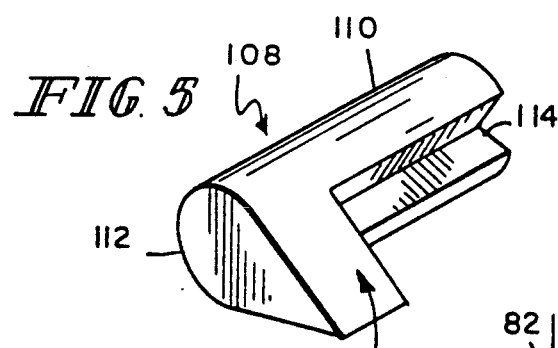
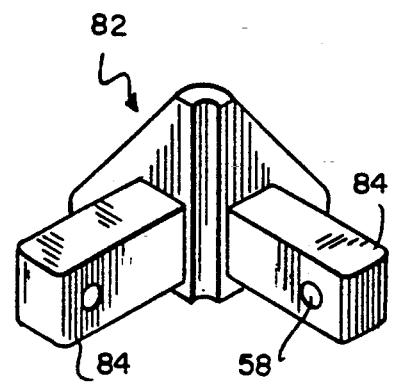
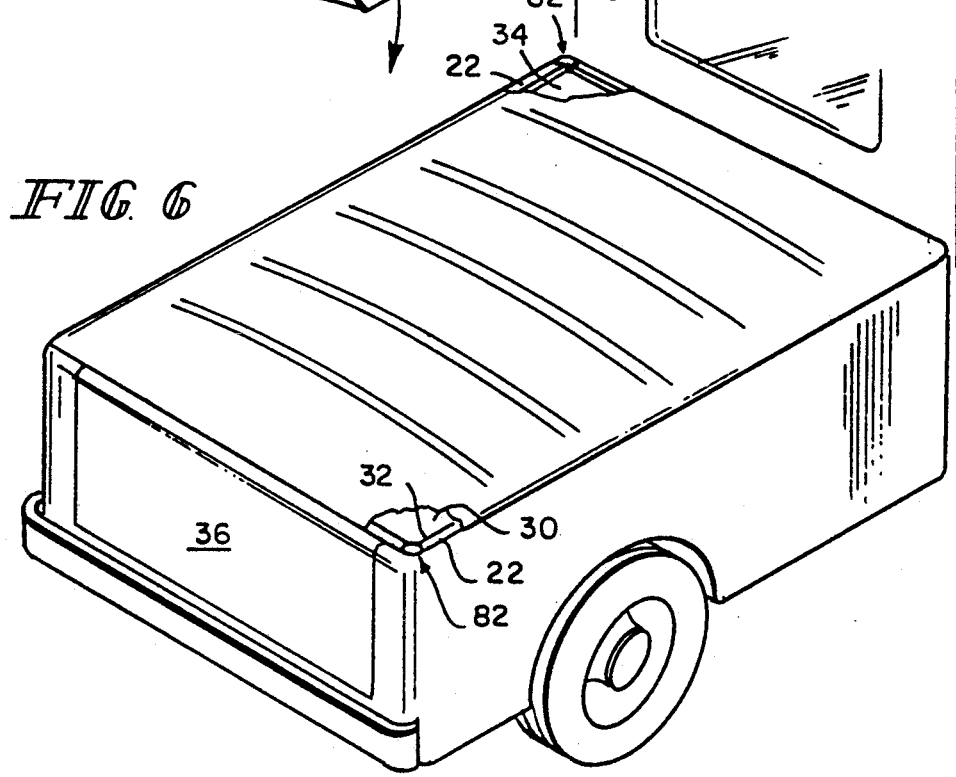

TONNEAU COVER ASSEMBLY

This is a continuation of application Ser. No. 07/677,123, filed Mar. 29, 1991, now abandoned.

BACKGROUND AND SUMMARY OF THE INVENTION

The present invention relates generally to tonneau covers for vehicles. More specifically, the present invention relates to a novel system for attaching a tonneau cover to a vehicle, such as a pickup truck or boat.

In recent years, tonneau covers have become very popular, and can be seen in use every day. Generally, a tonneau cover can be any device which is used to cover an opening on a vehicle. Tonneau covers are commonly used to cover seating sections of boats and convertible cars. However, tonneau covers are probably most commonly associated with pickup trucks. Various types of covers can be used to cover and shield the bed of a pickup truck. Tonneau covers are useful accessories to pickup trucks and the like because they can provide good protection from the elements. It is often desired to transport items in a bed of a truck, items which the user would prefer to keep sheltered from the rain and wind. A tonneau cover provides this protection.

For years, tonneau covers which utilized a snap-on fastening means were commonly used. Several snap receptacles would be secured directly to a vehicle. The tonneau cover would be provided with mating snaps which would be snapped onto the snap receptacles. This type of arrangement was undesirable because it required the extensive use of tools to imbed the snap receptacles into the vehicle. Furthermore, once the snap receptacles were in place, they could not be removed without leaving the vehicle permanently disfigured. Today, most tonneau cover units include a rail network which is attached to the top of the vehicle bed side walls. U.S. Pat. No. 4,639,033 to Wheatley, et al. and U.S. Pat. No. 4,496,184 to Byrd, et al. show tonneau cover assemblies utilizing a rail network. An upper portion is secured to the rail, spanning the vehicle bed. Securing the rail network to the vehicle, or the tonneau top to the rail network, often requires the use of tools. However, tools are not always available, and are not always handy to use. Therefore, a tonneau cover which can be assembled and disassembled without the use of tools is desired.

Tonneau assemblies may be divided into two general categories: those with a flexible cover, and those with a rigid cover. Tonneau assemblies with a rigid cover generally utilize a single, rigid member which is attached to the rails. Those utilizing a flexible cover stretch a flexible material over the vehicle bed, and secure it to the rails.

Those tonneau assemblies with rigid covers generally provide adequate shelter for the contents of the truck bed. However, this type of tonneau cover has limitations. Storage of such tonneau covers when not in use can be difficult. Because the rigid top does not fold, a storage space equal in size to the top is often needed. When a flexible cover is used, the top can often be folded, thus requiring minimal storage space. Rigid tonneau covers are also limited in it that they can be heavy and cumbersome. Due to their size and weight, it can be difficult for a single person to attach and remove this type of cover. A flexible top, being lighter and easier to manipulate, can easily be attached to or removed from a vehicle by one person.

In theory, tonneau assemblies are useful items because once the rail network is attached, the cover can quickly be attached to or removed from the vehicle. However, this theory is not always realized in practice. The speed and ease with which a tonneau top can be removed from the rail network depends in part on the nature of the connection between the top and rail. Tonneau covers are known which use various fastener means. Perhaps most common are those that use snaps, velcro TM or some similar means. Another common type of fastener utilizes a hook which is secured to the cover which engages the rail network. All of these types of fasteners, as currently used, have limitations.

Tonneau cover tops using velcro TM or some similar adhesive to affix the top to the rail are generally quick and easy to use. However, velcro TM does not always provide a tight seal against the flow of water and air. Thus, velcro TM fastened tops may not prevent water or other contaminants from entering the truck bed. Tonneau covers using snaps can be effective. However, many tonneau covers of this type require each snap be secured to the truck itself. This arrangement is disfavored because it can be time consuming to push each snap into place. Furthermore, this type of fastener may not prevent the penetration of water into the vehicle bed.

Tonneau covers which use a hook arrangement can avoid many of the limitations noted above. But, hook fasteners currently in the market also have limitations. One known arrangement is shown in U.S. Pat. No. 4,639,033 issued to Wheatley, et al. This reference discloses the use of J-shaped hooks which snap over a portion of the rail. In practice, it can be quite difficult to disengage this type of fastener from the rail. Flexible covers have a tendency to shrink in response to the elements, making it more difficult to disengage the J-shaped hook from the rail. Furthermore, during periods of cold weather, the J-shaped fastener may become rigid and lose its pliability. As this occurs, it can become exceedingly difficult to remove the fastener from the rail, and thus the cover from the vehicle. It is thus beneficial to provide a means for disengaging at least a portion of the fastener from the rail.

As mentioned earlier, making permanent holes or marks in the vehicle when attaching the rail network is highly undesirable. This permanent disfiguration can greatly decrease the value of the vehicle. Therefore, it is generally desired to attach the rail network to the vehicle without the need of making holes in the truck. One way of attaching the rail network to the vehicle is by using clamps. U.S. Pat. No. 4,496,184 issued to Byrd et al. shows a truck cap with a frame clamped to the vehicle. Clamping arrangements are desired because they can be removed without leaving marks on the vehicle. But, known clamping arrangements can be difficult to align and adjust once they are positioned with respect to the rail and vehicle bed. In addition, clamps are not always effective in combatting the torsional forces which act upon the rail network.

Many forces act upon the flexible tonneau cover and cause the cover to pull the rail network inward towards the center of the vehicle bed. The weight of the cover itself, the tension in the cover and the natural shrinkage all tend to provide a bending moment or torsional effect onto the rail network. This can cause the rail to separate from the vehicle side walls, allowing the passage of water or air therethrough. After time, this bending moment can cause warping of the rail network. Thus, if a clamping arrangement is to be used, it is desirable to provide a clamp which will overcome the torsional forces applied to the rail.

In addition to the torsional effect experienced by the rail network, the crossbars used in conjunction with flexible tonneau covers often experience a twisting or torsional force. The crossbars are used to aid in the support of the tonneau top, and generally span the entire width of the space being covered. The shrinking and pulling of the flexible cover can cause the crossbars to twist. Thus, it is beneficial to provide a tonneau cover with crossbars which resist the torsional forces applied thereto.

Accordingly, it is an object of the present invention to provide a tonneau cover assembly with crossbars that are able to withstand the torsional forces applied thereto.

Another object of the present invention is to provide a tonneau cover assembly which utilizes a flexible tonneau top.

A further object of the present invention is to provide a tonneau cover which, when removed from the vehicle, requires minimal storage space.

Yet another object of the present invention is to provide a tonneau cover which can easily be attached to and removed from the vehicle by a single person.

A still further object of the present invention is to provide a tonneau cover assembly which utilizes a clamp arrangement to secure the rail network to the vehicle which overcomes the torsional forces on the rail.

Another object of the present invention is to provide a tonneau cover assembly which includes a hook means of attaching the flexible cover to the rail network.

A further object of the present invention is to provide a tonneau cover assembly which includes a means for disengaging a portion of the hook assembly from the rail network.

Yet another object of the present invention is to provide a tonneau cover assembly having crossbars which are braced against the torsional forces applied thereto.

A still further object of the present invention is to provide a tonneau cover assembly which can be completely assembled and disassembled without the use of tools.

These and other objects are attained by a tonneau cover assembly generally comprising a rail network, a clamping means, a flexible top and one or more crossbars. A single rail is placed on top of each of the truck's side walls and front wall, and another rail spans the width of the bed adjacent the rear gate. Each rail is secured at opposite ends to the two adjacent rails using a cornerpiece. Being secured to one another, these four rails comprise the rail network. Each rail has a channel and a slot which spans its entire length. Padding may be placed between the rail and the truck bed to prevent scratching of the vehicle, and provide a better seal against the flow of water.

The rails are secured to the truck using clamps. The preferred clamp includes a generally U-shaped brace and a bracket. The bracket includes a head which is slidably received by the slot in the rail. The brace is then placed around the bracket and a portion of the vehicle side wall. By tightening thumb screws, the side wall is secured between the brace and the bracket. The bracket is allowed to pivot slightly, allowing the bracket head to exert a downward force on the rail.

The crossbars can then be positioned. The crossbars are preferably hollow, and include a plastic tip telescopically inserted at each end. The plastic tip effectively allows a crossbar to be of a variable length. This is beneficial as truck bed dimensions may vary slightly from truck to truck. The plastic tip snaps on to the bracket portion of the clamp, securing the crossbar across the truck bed. The underside of the tip is recessed, and accepts a tang which extends upward from the bracket. This limits the torsional motion of the tip and thus of the crossbar.

A flexible tonneau cover is then stretched over the crossbars. Around its periphery, the cover includes a hook assembly. The hook assembly includes a bight which hooks about the channel in the rail. This secures the cover to the truck bed. To disengage the cover, the tonneau cover assembly includes a stripping member. The stripping member includes an outwardly projecting tab and a pin. The pin rests within the channel and contacts the bight. By pressing the tab, the pin forcibly ejects a portion of the hook assembly from the channel. The remainder of the hook assembly can then easily be peeled off of the rail.

A second preferred embodiment of the present invention includes a hook assembly with a stripping means attached thereto. The hook assembly includes a bight, and a finger-pull. The finger-pull extends beyond the periphery of the flexible cover. By pulling the finger-pull, a portion of the hook assembly disengages the rail. The cover can then be peeled off of the rail.

Other objects, advantages and novel features of the present invention will become apparent in the following detailed description of the invention when considered in conjunction with the accompanying drawings.

BRIEF DESCRIPTION OF THE DRAWINGS

FIG. 1 is a cross sectional view of a tonneau cover assembly attached to the bed of a pickup truck.

FIG. 2 is an exploded view of the insert tip and portions of a crossbar and clamp in accordance with the present invention.

FIG. 3 is a perspective view of a second preferred embodiment of the stripping member in accordance with the present invention.

FIG. 4 is a perspective view of a cornerpiece in accordance with the present invention.

FIG. 5 is a perspective view of first preferred embodiment of a stripping means in accordance with the present invention.

FIG. 6 is a pickup truck equipped with a tonneau cover assembly in accordance with the present invention.

DESCRIPTION OF THE PREFERRED EMBODIMENTS

Referring now to the drawings, in which like-referenced characters indicate corresponding elements throughout the several views, attention is first directed to FIGS. 1 through 6 which generally illustrate preferred embodiments of a tonneau cover assembly according to the present invention, indicated generally as 20. Tonneau cover assembly 20 includes rail network 22, at least one clamp 24, flexible cover 26 and at least one crossbar 28. In the preferred embodiments shown, tonneau cover assembly 20 is designed for use with a pickup truck having bed 30 which includes two side walls 32, front wall 34 and rear gate 36. One rail 38 is attached to top 40 of front wall 34, and rails 38 are also attached to top 40 of side walls 32. A fourth rail 38 spans the width of truck bed 30 adjacent rear gate 36.

Rails 38 are preferably constructed of a sturdy, light-weight material, such as aluminum. Each rail 38 includes channel 42 extending its entire length. Channel 42 is preferably of a generally circular cross-section. However, in the preferred embodiment shown the circle is not complete, leaving lip 44 exposed. Adjacent channel 42, rail 38 includes slot 46. Slot 46 also extends the entire length of rail 38. Slot 46 is of a generally rectangular cross-section, and is designed to receive clamp 24. Adjacent both channel 42 and slot 46 is bottom surface 48 of rail 38. Bottom surface 48 is preferably of a flat, smooth finish. As rail 38 is secured to the truck, bottom surface 48 and top surface 40 of front wall 34 and side walls 32 form planar mating surfaces. Padding 50 can be inserted between bottom surface 48 and top 40, thus reducing any scratching of the vehicle. Padding 50 may also provide additional sealing against the flow of water or air into truck bed 30.

Rail network 22 may be attached to the vehicle in any number of ways. However, to prevent permanent disfiguration of the vehicle, it is preferred that a plurality of clamps 24 be used. By clamping rail network 22 to the truck, it is not necessary to make any holes in the vehicle. Furthermore, the entire tonneau cover assembly 20 may be attached to the truck without the use of tools.

Clamp 24 generally comprises two members: brace 52 and bracket 54. Brace 52 is of a generally U-shaped configuration, and includes elongate bore 56 and threaded bore 58. Elongate bore 56 is preferably oval in shape, and is fit to receive thumb screw 60. Elongate bore 56 is not threaded, and allows transverse motion of thumb screw 60 therein. Threaded bore 58 is internally threaded, and receives positioning thumb screw 62. Bracket 54 includes first leg 64 and second leg 66. First leg 64 includes threaded bore 58 to receive thumb screw 60. First leg 64 also includes void 68 which houses thumb screw 60 as it is tightened.

Brace 52 and bracket 54 are attached by positioning surface 70 of first leg 64 adjacent surface 72 of brace 52. Thumb screw 60 can then be placed through elongate bore 56 and tightened into threaded bore 58. Preferably, thumb screw 60 is not completely tightened. This allows bracket 54 to slide with respect to brace 52, and thumb screw 60 slide within elongate bore 56. Positioning thumb screw 62 can be tightened through threaded bore 58 until it contacts first leg 64 of bracket 54. As positioning thumb screw 62 is tightened against first leg 64, bracket 54 tends to pivot at corner 74. Continued turning of positioning thumb screw 62 causes first leg 64 to contact rim 76 on brace 52. This pivoting action of bracket 54 is beneficial because it allows clamp 24 to exert a vertical force onto rail 38.

As can be seen in FIG. 2, second leg 66 includes tang 78. Tang 78 is a generally flat, rectangular member that extends generally transverse from second leg 66. Tang 78 aids in reducing the effect of torsional forces upon crossbar 28. Second leg 66 also includes head 80 at its distal end. Head 80 is configured to be slidably receivable by slot 46. Thus is can be known how clamp 24 and rail network 22 engage one another. Head 80 slides in to slot 46, and can be positioned anywhere along the length of rail 38.

To firmly secure rail network 22 to truck bed 30, rails 38 are placed on top of side walls 32 and front wall 34. A fourth rail 38 is positioned across the width of bed 30, adjacent to rear gate 36. Brackets 54 are then slid into position. Head 80 is placed into slot 46 and positioned along the length of rail 38. The number of clamps 24 needed to secure rail 38 to the truck varies depending on the size truck bed 30. As a general rule, four clamps 24 are needed to secure rail 38 to side wall 32 for short truck beds 30, and five clamps 24 are needed for long beds. No clamps are used to secure rail 38 to front wall 34 or adjacent rear gate 36. It is preferred that a clamp 24 be positioned as near front wall 34 and rear gate 36 as possible. The remaining clamps 24 are to be spaced evenly along the length of rail 38.

Rails 38 are connected to one another using cornerpiece 82. Cornerpiece 82 includes two plugs 84 extending therefrom. Plugs 84 extend from cornerpiece 82 so as to form an angle of approximately 90°. Each plug 84 also contains threaded bore 58 therein. Plug 84 is generally rectangular in shape, and is telescopically receivable into slot 46. Cornerpiece 82 is positioned between two adjacent rails 38. One plug 84 of cornerpiece 82 is positioned into slot 46 of one rail 38 and the second plug 84 is similarly received by the adjacent rail 38. In this manner, rails 38 are secured together forming rail network 22.

Once rails 38 are secured together, and brackets 54 are in place, rail network 22 can be clamped to the vehicle. Brace 52 is positioned about each bracket 54. Brace 52 is positioned such that a portion of side wall 32 rests between rim 76 of brace 52 and first leg 64 of bracket 54. Cushion 90 is preferably placed between first leg 64 and side wall 32 to prevent scratching of the vehicle. Thumb screw 60 is placed through elongate bore 56 and into threaded bore 58. It is preferred that thumb screw 60 not be completed tightened, but allow some transition of bracket 54 with respect to brace 52. Positioning thumb screw 62 can then be tightened. As positioning thumb screw 62 is turned, side wall 32 is secured between rim 76 and first leg 64. As the pressure increases, bracket 54 pivots slightly at corner 74. This pivoting causes head 80 to exert a downward force F onto rail 38. Downward force F secures rail network 22 to the vehicle, and also balances the torsional forces experienced by rail 38. After positioning thumb screw 62 is fully tightened, thumb screw 60 may also be tightened. Rail network 22 is thus fully secured to the vehicle.

Tonneau cover assembly 20 preferably includes a plurality of crossbars 28. Crossbar 28 is preferably made of a sturdy, light-weight material such as aluminum. It is also preferred that crossbar 28 be hollow and have a generally rectangular cross-section. Crossbar 28 spans the width of truck bed 30 and aids in the support of flexible cover 26. The number of crossbars 28 needed to provide flexible cover 26 with adequate support varies, depending on the size of the truck. Generally, three crossbars 28 are adequate for large vehicles, and two crossbars 28 are adequate for small vehicles. While it is possible to design crossbars 28 to fit directly on to rail 38 or side wall 32, it is preferred that crossbar 28 snap on to a portion of clamp 24.

The dimensions of bed 30 on any two trucks are seldom identical. Two trucks of the same model and same year may have slightly different dimensions. Thus, it is generally necessary to cut crossbars 28 individually to fit each particular truck. This is costly, and prevents mass production of identical crossbars 28. To overcome this problem, tonneau cover assembly 20 includes insert 92. Insert 92 is preferably formed of plastic. Insert 92 includes body 94 and shoulder 96. Body 94 is dimensioned so as to be telescopically received by crossbar 28. Ribs 98 located on body 94 secure a tight fit of insert 92 within crossbar 28. In the preferred embodiments shown, one insert 92 is inserted into each end of crossbar 28. Insert 92 alleviates the problem of varying truck bed widths. As insert 92 telescopically engages crossbar 28, its position within crossbar 28 is variable. Thus, in effect, crossbar 28 can be expanded to adjust to the size of the vehicle.

Insert 92 also alleviates another problem in the tonneau cover industry. Due to weight and natural shrinkage of flexible cover 26, crossbars 28 often experience torsional forces. These forces tend to twist crossbar 28. However, insert 92 can help overcome these torsional forces. Once body 94 of insert 92 is positioned within crossbar 28, crossbar 28 can be snapped onto clamp 24. Insert 92 includes cavity 102 therein. As insert 92 is snapped onto bracket 54, tang 78 located on second leg 66 is received into cavity 102. Preferably, tang 78 fits snugly into cavity 102. Tang 78 limits the twisting or torsional motion of insert 92, and thus of crossbar 28. Insert 92 thus provides a means for effectively adjusting the length of crossbar 28, as well as limiting the effect of torsional forces upon crossbar 28.

After rail network 22 has been clamped on to the vehicle, and crossbars 28 are snapped in to position, tonneau cover assembly is ready to receive flexible cover 26. Flexible cover 26 is preferred over rigid covers because of the ease with which it can be handled. Flexible cover 26 is preferably made of vinyl, but any similar weather-resistant flexible material may be used. Flexible cover 26 can be attached to rail network 22 in a number of ways, but the preferred method utilizes hook assembly 104. Hook assembly 104 is preferably a plastic extrusion having bight 106. Hook assembly 104 is attached to the periphery of flexible cover 26. Sewing is the preferred method of attaching hook assembly 104 to flexible cover 26. Flexible cover 26 can then be attached to rail network 22 by hooking bight 106 about lip 44 on rail 38. Attaching flexible cover 26 to rail 38 is generally an easy task. By placing bight 106 adjacent lip 44, and exerting a downward force on to hook assembly 104, bight 106 will curl into position about lip 44.

While it is relatively easy to secure flexible cover 26 to rail network 22, it is not always easy to remove the cover. As flexible cover 26 is exposed to the elements it may experience some shrinkage. As flexible cover 26 shrinks it becomes more difficult to remove bight 106 from lip 44. Also, during cold weather, plastic hook assembly 104 may become more rigid and less pliable. As hook assembly 104 loses its plasticity, it may become more difficult to remove bight 106 from lip 44. Because of the possible difficulty in removing bight 106 from lip 44, tonneau cover assembly 20 includes stripping member 108. Stripping member 108 is used to eject a portion of bight 106 from channel 42. Once a portion of bight 106 is disengaged, it is easy to peel flexible cover 26 from rail 38.

Stripping member 108 can take on many shapes and dimensions. However, in the preferred embodiment shown in FIG. 5 stripping member 108 includes pin 110 and tab 112. Pin 110 rests within channel 42, while tab 112 rests outside of the channel, extending radially from pin 110. Pin 110 includes notch 114 cut therein, which is positioned adjacent lip 44. Pushing tab 112 causes pin 110 to forcibly eject a portion of bight 106 from channel 42. Once a portion of hook assembly 104 is disengaged from rail 38, the remainder of hook assembly 104 can easily be peeled off of channel 42. It is preferred that a stripping member 108 be provided for each of the four sides of the vehicle.

In a second preferred embodiment shown in FIG. 3, hook assembly 104 includes finger pull 116. Finger pull 116 depends from bight 106, and extends beyond the periphery of flexible cover 26. Finger pull 116 allows a user to pull a portion of bight 106 from lip 44. Thus, a portion of hook assembly 104 is disengaged from channel 42. Again, once a portion of hook assembly 104 is removed, the remainder peels off easily. It is also beneficial, when using this embodiment, to include at least one finger pull 116 for each side of flexible cover 26.

From the preceding description of the preferred embodiments it is evident that the objects of the invention are attained by the present invention. Although this invention has been described and illustrated in detail, it is to be clearly understood the same is by way of illustration and example only and is not to be taken by way of limitation. Therefore, the spirit and scope of this invention are to be limited only by the terms of the appended claims.

What is claimed:

1. A tonneau cover assembly for attaching a flexible tonneau cover about a portion of a vehicle, comprising:
   a rail network;
   at least one clamp for removably attaching said rail network to said vehicle;
   connecting means attached to said flexible tonneau cover for connecting said flexible tonneau cover to said rail network;
   at least one crossbar substantially spanning the width of said portion of said vehicle; and
   anti-torsion means having an insert with a cavity open downwardly of the vehicle which insert extends widthwise of the vehicle to engage said at least one cross bar in said widthwise vehicle direction and including a tang extending generally vertically and upwardly of said vehicle into said cavity from said at least one clamp to engage sidewalls of the open cavity for limiting the effects of torsional forces applied thereto.

2. The tonneau cover assembly according to claim 1, said insert further including at least one raised rib thereon for providing a tight fit between said insert and said at least one crossbar.

3. A tonneau cover assembly for attaching a flexible tonneau cover about a portion of a vehicle, comprising:
   a rail network having a longitudinally extending rail thereon which is attached to said vehicle;
   said rail network having an outwardly opened hollow therein;
   securing means for removably attaching said rail network to said vehicle;
   connecting means attached to said flexible tonneau cover for connecting and securing said flexible tonneau cover to said outwardly opened hollow of said rail network;
   stripping means having a portion thereof located internally within the hollow in said rail network for removing at least a portion of said connecting means from said rail network; and
   wherein said stripping means includes a pin and a tab, said pin being the portion that is located internally within the hollow of said rail network, and said tab projecting radially from said pin and outside of said hollow in said rail network.

4. The tonneau cover assembly according to claim 3, said pin including a notch therein, said notch positioned adjacent a bight of said connecting means when said bight is engaging said rail network.

5. The tonneau cover assembly according to claim 4, wherein applying a force to said tab causes said pin to forcibly eject a portion of said bight from said rail network.

6. A stripping mechanism for disengaging a portion of a flexible tonneau cover from a rail network, said flexible tonneau cover including attaching means thereon having a bight for attaching said flexible tonneau cover to said rail network, said rail network including an open channel therein for receiving said bight of said attaching means, comprising:
    a tab having a portion thereof which is located internally within said channel and a portion located externally of the channel, whereby exerting a force on said external portion of said tab causes said internal portion to engage said bight to disengage said attaching means from said channel of said rail network; and
    wherein said internal tab portion includes a pin, said tab external portion extending generally radially therefrom, and said pin resting internally within said channel.

7. The stripping mechanism according to claim 6, said pin including a notch therein, said pin oriented such that said notch is adjacent said bight when said attaching means is attached to said channel.

8. The stripping mechanism according to claim 7, whereby said force exerted on said tab causes said pin to contact a portion of said bight, forcibly ejecting said portion of said bight from said channel.

9. A clamping mechanism for securing a tonneau cover assembly to a vehicle, said tonneau cover assembly including a rail network attached to said vehicle, said rail network having a longitudinal slot therein, at least one cross bar substantially spanning a portion of said vehicle, a flexible tonneau cover and connecting means for removably attaching said flexible tonneau cover to said rail network, comprising:
    at least one clamp for removably securing said rail network to said vehicle;
    said at least one clamp including a brace and a bracket;
    said bracket having a portion thereof positioned within said brace;
    said brace and said bracket being adjustably connected so as to receive a portion of said vehicle therebetween;
    said bracket including a head thereon;
    said head being slidably engagable with said longitudinal slot on said rail network;
    said at least one clamp exerting a vertical force upon said rail network and said vehicle; and
    said at least one clamp including anti-torsional means thereon for limiting the effects of torsional forces on said at least one cross bar.

10. The clamping mechanism according to claim 9, wherein said portion of said bracket being within said brace has a pivot portion thereon about which said bracket is pivotable with respect to said brace and wherein said brace causes said bracket to pivot causing said head to exert a vertical force on said rail network and said vehicle.

* * * * *